United States Patent [19]

Harada et al.

[11] 4,285,540

[45] Aug. 25, 1981

[54] BODY STRUCTURE FOR AN AUTOMOBILE WITH CONCEALED WIPERS

[75] Inventors: Hideo Harada, Yokosuka; Eiji Imai, Yokohama, both of Japan

[73] Assignee: Nissan Motor Co., Ltd., Yokohama, Japan

[21] Appl. No.: 62,997

[22] Filed: Aug. 2, 1979

[30] Foreign Application Priority Data

Aug. 24, 1978 [JP] Japan .......................... 53/115122[U]

[51] Int. Cl.³ .............................. B60J 1/02; B60S 1/04
[52] U.S. Cl. .................................. 296/192; 15/250.19
[58] Field of Search .......................... 296/192, 84 R; 15/250.16, 250.17, 250.19

[56] References Cited

U.S. PATENT DOCUMENTS

| | | | |
|---|---|---|---|
| 3,230,162 | 1/1966 | Gilchrist | 204/181 |
| 3,304,250 | 2/1967 | Gilchrist | 204/181 |
| 3,421,174 | 1/1969 | Reese | 15/250.19 |
| 3,747,500 | 7/1973 | Redd | 98/2.10 |

*Primary Examiner*—Randolph A. Reese
*Assistant Examiner*—John A. Carroll
*Attorney, Agent, or Firm*—Silverman, Cass & Singer, Ltd.

[57] ABSTRACT

A body structure for an automobile with concealed wipers including a cowl top upper panel formed with air intake holes concealed by an engine hood. The structure includes a rubber seal adapted to be in contact with an inner panel of the engine hood when the engine hood is set in closed position and surrounding the air intake holes so as to separate them from the engine or compartment, thereby preventing the air in the engine compartment from mixing with the air to be intaken, effectively discharging the heated air in the engine compartment out of the automobile and making it possible to provide apertures for draining an electrodepositing liquid at suitable positions in the inner panel of the engine hood.

4 Claims, 5 Drawing Figures

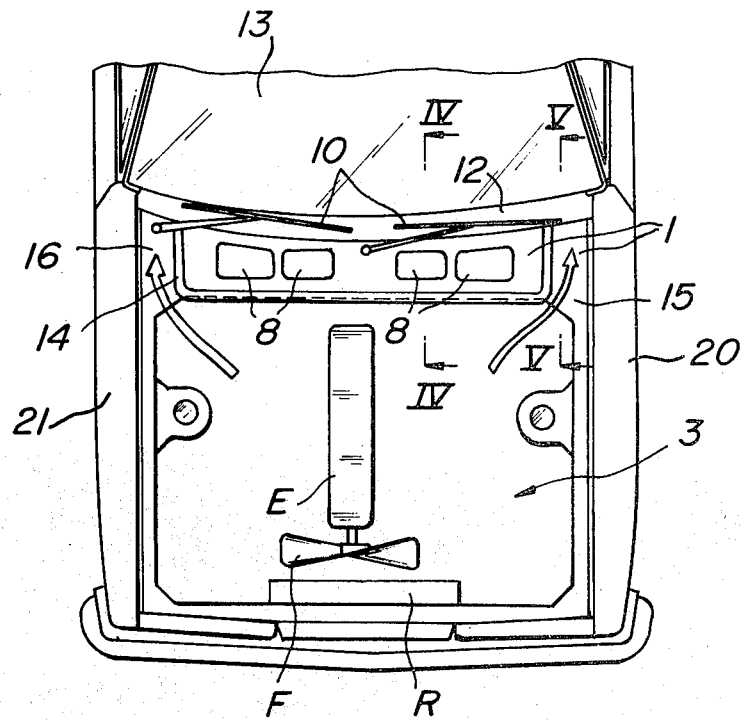
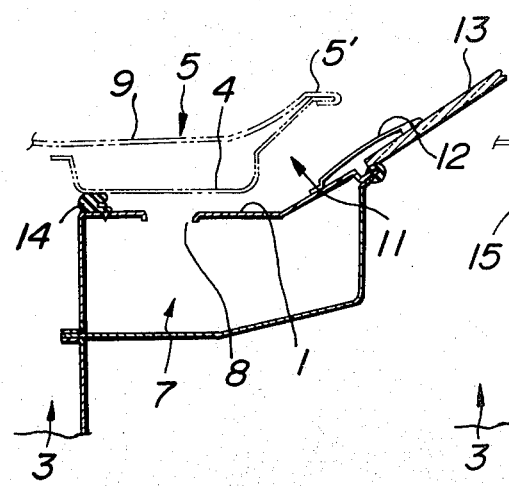
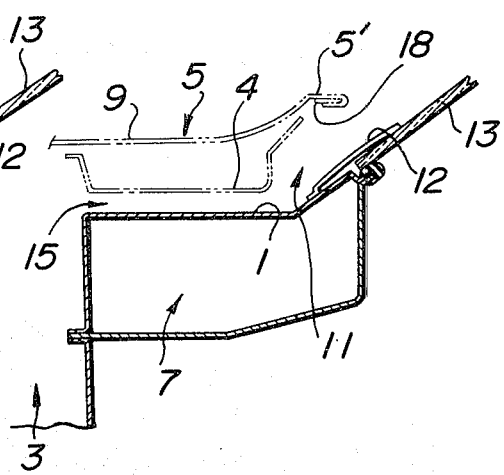

BODY STRUCTURE FOR AN AUTOMOBILE WITH CONCEALED WIPERS

BACKGROUND OF THE INVENTION

1. Field of the Invention

The present invention relates to a body structure for an automobile with concealed wipers.

2. Description of the Prior Art

In a conventional automobile with concealed wipers, as shown in FIG. 1 a cowl top upper panel is provided at its front side with a rubber seal 2 along its overall width such that an inner surface of an engine hood or bonnet is brought into contact with the rubber seal so as to shut or close off an engine compartment 3 from the cowl top to prevent the heated air from exhausting through the rear end of the engine compartment. On the other hand, as shown in FIG. 2 a hood inner panel 4 rearward of the rubber seal 2 is formed with apertures 6 for draining an electrodepositing liquid for electrodeposition painting the engine hood 5. The heated air shown as arrows A in FIG. 2 in the engine compartment 3, therefore, flows through the apertures 6 and together with the atmosphere shown as an arrow B through air intake holes 8 into a cowl box 7 communicating with a ventilator and causes the ventilating air temperature to rise. It is very difficult to compromise the requirements for ventilation in the compartment and painting because the apertures 6 for draining the electrodepositing liquid are indispensable for the painting.

SUMMARY OF THE INVENTION

It is an object of the invention to provide an improved body structure for an automobile with concealed wipers which solves the problem in the prior art above described.

It is further object of the invention to provide a body structure for an automobile with concealed wipers, which is capable of effectively discharging the heating or heated air in the engine compartment out of a vehicle and draining the electrodepositing liquid for electrodeposition painting an engine hood.

To accomplish these objects, the body structure for an automobile with concealed wipers including a cowl top upper panel formed with air intake holes concealed by an engine hood according to the invention comprises a rubber seal to be in contact with an inner panel of said engine hood set in position so as to separate said air intake holes from the engine compartment in a manner surrounding said air intake holes.

The invention will be more fully undestood by referring to the following detailed specification and claims taken in connection with the appended drawings.

BRIEF DESCRIPTION OF THE DRAWINGS

FIG. 3 is a plan view of a main part of one embodiment of the body structure for an automobile with concealed wipers according to the invention;

FIG. 4 is a partial sectional view of the body structure taken along line IV—IV in FIG. 3; and FIG. 5 is a partial sectional view of the body structure taken along line V—V in FIG. 3.

DETAILED DESCRIPTION OF THE PREFERRED EMBODIMENT

Figure 1:
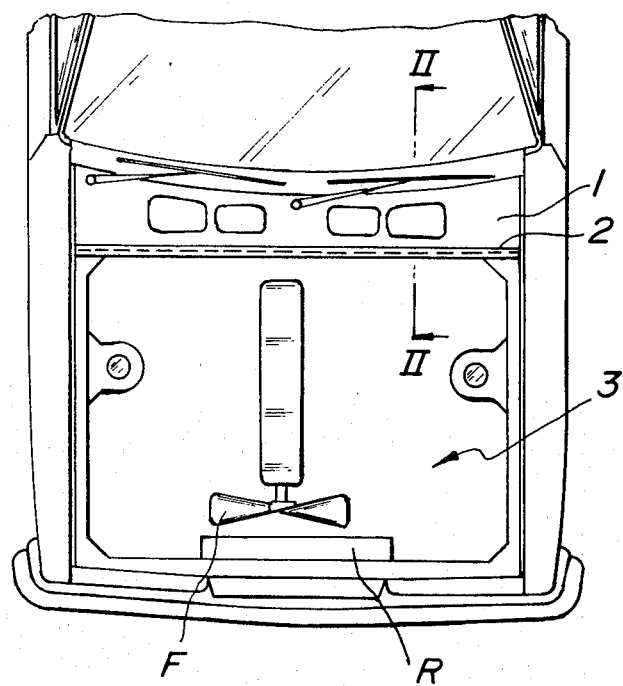
FIG. 1 is a plan view of a main part of a body structure of an automobile with concealed wipers in the prior art as described above.
Figure 2:
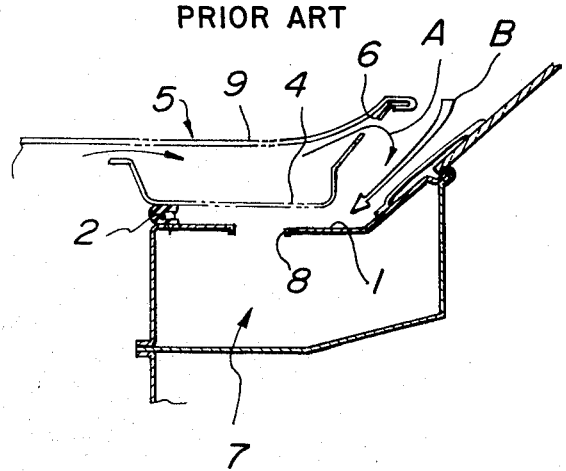
FIG. 2 is a partial sectional view of the body structure taken along line II—II in FIG. 1 as described above.

Referring to FIGS. 3-5 illustrating one embodiment of the invention, a cowl top upper panel 1 is formed with air intake holes 8 for introducing the atmosphere into a cowl box 7. An engine hood 5 for an automobile with concealed wipers covers an engine compartment 3 in a known manner and includes a raised rear end 5' which conceals the cowl top upper panel 1 thereunder and forms with body side members (mainly the cowl top upper panel) a housing 11 for receiving wipers 10. A molding 12 serves to hide a connection between the cowl top upper panel 1 and the lower end of a windshield or windscreen 13 and to house wiper blades in the housing 11 without any difficulty. The automobile includes front fenders 20 and 21 framing the sides of the engine compartment 3.

With the body structure for an automobile with concealed wipers arranged above described, a rubber seal 14 which is U-shaped as viewed in FIG. 3 is arranged in a manner surrounding the air intake holes 8, which are inlets for introducing the atmosphere into the cowl box 7, to seal the box 7 from the engine compartment 3. By surrounding the air intake holes 8 in the manner above described the rubber seal 14 also causes the sides 15 and 16 of the cowl top upper panel 1 to form air passages through which the interior of the engine compartment 3 communicates with the outside of the hood (FIG. 3) or ambient atomsphere. These air passages thus are formed by the engine hood 5, the sides 15 and 16 of cowl top upper panel 1, front fenders 20 and 21 and rubber seal 14. In other words, a space including the air intake holes surrounded by the rubber seal 14 is closed off from the engine compartment 3 when the engine hood 5 is in closed position which brings the inside of the inner panel 4 into close contact with the rubber seal 14. Apertures 18 for draining the electrodepositing liquid for electrodeposition painting the hood are provided in the inner panel 4 of the engine hood 5 at locations outside of the rubber seal 14 in opposition to the sides 15 and 16 of the upper panel 1.

The body structure according to the invention as above described operates in a manner as follows. Atmospheric air passes through a radiator R with the aid of a fan or movement of the automobile for heat exchanging with the radiator and flows into the engine compartment 3 cooling the engine E, and flows to the rear of the engine compartment 3 and thereafter most of the air goes out of the automobile through the underside of the vehicle body. Part of the air flows through the sides 15 and 16 of the cowl box, outside of the rubber seal 14 substantially surrounding the air intake holes 8 between the cowl box upper panel 1 and the engine hood 5 covering the engine compartment and delivered from the sides of the vehicle body. In this manner, part of the air introduced into the engine compartment 3 can be forced toward the sides of the windshield 13 effectively because at locations above the engine hood, the air flows at high speeds. There is a tendency for the heated air to stay in the upper portion of the engine compartment 3 due to heat radiation from the engine E or the like. The air flow delivered through the sides 15 and 16 of the cowl top upper panel 1 effectively forces the heated air in the upper portion of the engine compartment 3 out of the bonnet. Accordingly, the air intake holes 8 surrounded by the rubber seal 14 is not subjected to the heated air from the engine compartment 3 so as to be able to introduce fresh air into the cowl box 7.

As can be seen from the above description, according to the invention the body structure for an automobile with concealed wipers comprises rubber seal adapted to be in contact with the inside of an engine hood to separate the air intake holes from the engine compartment in the manner surrounding the air intake holes, thereby correctly controlling the temperature in the engine compartment, preventing the air in the engine compartment from mixing in the air to be introduced into the cowl box and making it possible to provide apertures for draining the electrodepositing liquid for electrodeposition painting the engine hood at suitable positions in the inner panel of the engine hood.

It is further understood by those skilled in the art that the foregoing description are preferred embodiments of the disclosed structure and that various changes and modifications may be made in the invention without departing from the spirit and scope thereof.

What is claimed is:

1. A body structure for an automobile, the automobile having an engine compartment, a cowl top upper panel adjacent the rear of the engine compartment, and wipers arranged on the cowl top upper panel, said structure comprising:

an engine hood covering the engine compartment, the cowl top upper panel and said wipers while in a closed position, the hood including an inner panel adjacent the cowl top upper panel, said cowl top upper panel including air intake holes therein concealed by the engine hood; and a rubber seal carried on top of said cowl top upper panel and in contact along the length of the seal with the inner panel while the engine hood is in the closed position, said inner panel, said cowl top upper panel and said rubber seal forming air passages on sides of the seal opposite the air intake holes, said air passages extending from the rear of the engine compartment to the outside of the hood through which air in the engine compartment may communicate with the ambient atmosphere.

2. The body structure as claimed in claim 1 in which the rubber seal is arranged on top of the cowl top upper panel in a U-shape with the open part of the U-shaped opposite the engine compartment.

3. The body structure as claimed in claims 1 or 2, the hood being subjected to electrodeposition painting with an electrodepositing liquid and there are apertures through said inner panel at said air passages for draining said electrodepositing liquid.

4. The body structure as claimed in claim 2 in which said automobile includes front fenders framing the sides of the engine compartment, and said cowl top upper panel includes side portions adjacent the fenders and partitioned from said air intake holes by said rubber seal, said air passages being defined by said engine hood, said side portions and said rubber seal.

* * * * *